(12) United States Patent
Camp, Jr.

(10) Patent No.: US 6,411,826 B1
(45) Date of Patent: Jun. 25, 2002

(54) PORTABLE RADIOTELEPHONES INCLUDING PATCH ANTENNAS HAVING OPENINGS THEREIN

(75) Inventor: William O. Camp, Jr., Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/193,587

(22) Filed: Nov. 17, 1998

(51) Int. Cl.[7] .................................................. H04B 1/38
(52) U.S. Cl. ........................ 455/566; 455/90; 455/456; 343/702
(58) Field of Search ................................. 455/556, 566, 455/90, 575, 12.1; 343/100 MS, 702

(56) References Cited

U.S. PATENT DOCUMENTS

| | | | |
|---|---|---|---|
| 5,235,633 A | | 8/1993 | Dennison et al. .............. 379/60 |
| 5,410,749 A | | 4/1995 | Siwiak et al. ................ 455/280 |
| 5,625,668 A | | 4/1997 | Loomis et al. ................. 379/58 |
| 5,710,987 A | | 1/1998 | Paulick ......................... 455/90 |
| 5,752,204 A | | 5/1998 | Epperson et al. ............ 455/575 |
| 5,786,789 A | * | 7/1998 | Janky ........................... 342/357 |
| 5,877,724 A | * | 3/1999 | Davis ........................... 342/357 |
| 6,002,367 A | * | 12/1999 | Engblom et al. ..... 343/700 MS |
| 6,222,501 B1 | * | 4/2000 | Yajima et al. ................ 343/878 |
| 6,292,147 B1 | * | 7/2000 | Ham ............................. 343/702 |
| 6,128,515 A | * | 10/2000 | Kabler et al. ................ 455/566 |
| 6,201,501 B1 | * | 3/2001 | Arkko et al. ................ 343/702 |

FOREIGN PATENT DOCUMENTS

| | | | |
|---|---|---|---|
| EP | 0774843 A2 | 5/1997 | ........... H04B/7/185 |
| EP | 0818690 A2 * | 1/1998 | ............. G01S/5/14 |
| FR | 2 754 942 | 10/1996 | .......... H01Q/13/00 |
| WO | WO97/26714 | 7/1997 | ............. H04B/1/38 |
| WO | 97/34381 | 9/1997 | ........... H04B/17/00 |
| WO | WO98/09181 | 3/1998 | ............. G01S/5/14 |

OTHER PUBLICATIONS

International Search Report, International Application No. PCT/US99/21124.
Communication Relating to the Results of the Partial International Search, International Application No. PCT/US99/21124.

* cited by examiner

Primary Examiner—Edward F. Urban
Assistant Examiner—Tilahun Gesesse
(74) Attorney, Agent, or Firm—Myers Bigel Sibley & Sajovec

(57) ABSTRACT

A portable radiotelephone includes a transceiver, a processor, a speaker, a microphone, and a patch antenna. The transceiver transmits and receives radiotelephone communications, and the processor processes the radiotelephone communications transmitted and received by the transceiver. The speaker generates sound responsive to the received radiotelephone communications, the microphone generates electrical signals for the transmitted radiotelephone communications responsive to outside sound, and the patch antenna includes a conductive layer coupled to at least one of the processor and the transceiver. More particularly, the patch antenna can be a global position patch antenna that receives electromagnetic global position signals from a global position satellite.

31 Claims, 4 Drawing Sheets

PORTABLE RADIOTELEPHONES INCLUDING PATCH ANTENNAS HAVING OPENINGS THEREIN

FIELD OF THE INVENTION

The present invention relates to the field of communications and more particularly to radiotelephone communications.

BACKGROUND OF THE INVENTION

It has been proposed to provide global positioning features in cellular radiotelephones. For example, U.S. Pat. No. 5,235,633 to Dennison et al. discusses a cellular telephone system that uses the position of a mobile unit to make call management decisions. In particular, each mobile unit includes a global positioning system (GPS) receiver that receives information from a constellation of satellites to determine the precise location of the mobile unit. This position information is relayed to the cell site initially managing the mobile unit, and the mobile unit is handed off to a cell site that is most appropriate for the call.

In addition, U.S. Pat. No. 5,625,668 to Loomis et al. discusses a positioning reporting cellular telephone. The cellular telephone of this patent includes a global positioning system (GPS) receiver and a cellular transceiver. In addition, a data processing facility converts latitude, longitude, velocity, and bearing information provided by the GPS receiver into meaningful descriptors that are spoken with a speech synthesizer. The disclosures of both of these patents are hereby incorporated herein in their entirety by reference.

Portable radiotelephones including GPS receivers have typically used an additional antenna to provide GPS reception. For example, quadrafilar helix antennas extending from the radiotelephone body have been used. The size constraints on these antennas, however, may reduce the gain available using quadrafilar helix antennas. Moreover, these antennas may be oriented at less than ideal angles and/or may be too close to the user's body when used during telephone communications further reducing gain. Accordingly, there continues to exist a need in the art for improved antennas for GPS receivers incorporated into radiotelephones.

SUMMARY OF THE INVENTION

It is therefore an object of the present invention to provide improved antennas for cellular radiotelephones.

It is another object of the present invention to provide improved antennas for cellular radiotelephones including GPS receivers.

These and other objects are provided according to the present invention by a radiotelephone including a patch antenna including a conductive layer for receiving electromagnetic signals. In particular, the patch antenna can be used to receive global position signals in a radiotelephone including global position (GPS) features. Accordingly, the patch antenna can be included in/on the radiotelephone body without significantly affecting the dimensions thereof.

In the past, patch antennas have not generally been used in portable radiotelephones because the vertical orientation of the radiotelephone against the user's head, as occurs during normal radiotelephone use, is not desirable for patch antenna reception and gain. The inventors have realized, however, that a patch antenna can be used advantageously during radiotelephone GPS operations because the radiotelephone can be held horizontally away from the user's head. Moreover, the patch antenna can be added to the radiotelephone without significantly affecting the dimensions of the radiotelephone because the patch antenna can be incorporated substantially parallel to a face of the radiotelephone body.

In particular, a portable radiotelephone according to the present invention can include a transceiver, a processor, a speaker, a microphone, and a patch antenna. The transceiver transmits and receives radiotelephone communications, and the processor processes the radiotelephone communications transmitted and received by the transceiver. The speaker generates sound responsive to the received radiotelephone communications, and the microphone generates electrical signals for the transmitted radiotelephone communications responsive to outside sound. The patch antenna includes a conductive layer coupled to at least one of the processor and the transceiver.

More particularly, the patch antenna can be a global position patch antenna that receives electromagnetic global position signals from global position satellites, and the processor can include a global position receiver that determines a position of the radiotelephone based on the received electromagnetic global position signals.

The portable radiotelephone can include a radiotelephone body housing the speaker, the microphone, the transceiver, and the processor. In addition, an opening can be provided through the radiotelephone body adjacent the speaker to allow the generated sound from the speaker to pass therethrough, and the patch antenna can be located adjacent the speaker with an opening therein aligned with the opening in the face of the radiotelephone body to allow the generated sound from the speaker to pass therethrough.

Alternately, the patch antenna can have an opening therein aligned with another opening in the radiotelephone body to allow outside sound to pass through to the microphone. According to another alternative, the patch antenna can be adjacent to a keypad and have an opening therein aligned to allow a key of the keypad to move therethrough.

The radiotelephone can also include a display coupled to the processor wherein the processor generates a message on the display during global position calculations to encourage a horizontal orientation of the patch antenna. For example, the display might instruct the user to wait with the radiotelephone in a horizontal position held away from the user's body until the global position calculations have been completed.

The patch antenna can be provided, for example, by a conductive layer on a dielectric substrate inside the radiotelephone body. Alternately, the conductive layer can be provided on a surface of the radiotelephone body thereby eliminating the need for a separate dielectric layer. In other words, the radiotelephone body can be formed of a plastic that does not significantly attenuate the global position signals received from the global position satellites, and the conductive layer of the patch antenna can be formed as a part of the radiotelephone body. Furthermore, the conductive layer can be formed on either an inside or outside surface of the radiotelephone body. Furthermore, the patch antenna can be provided on a flip portion of the radiotelephone body.

The radiotelephones, and methods of the present invention can thus be used to provide a global position antenna within a portable radiotelephone without significantly affecting the dimensions of the radiotelephone. The radiotelephones, and methods of the present invention can also provide improved reception of GPS signals.

DETAILED DESCRIPTION

Figure 1:
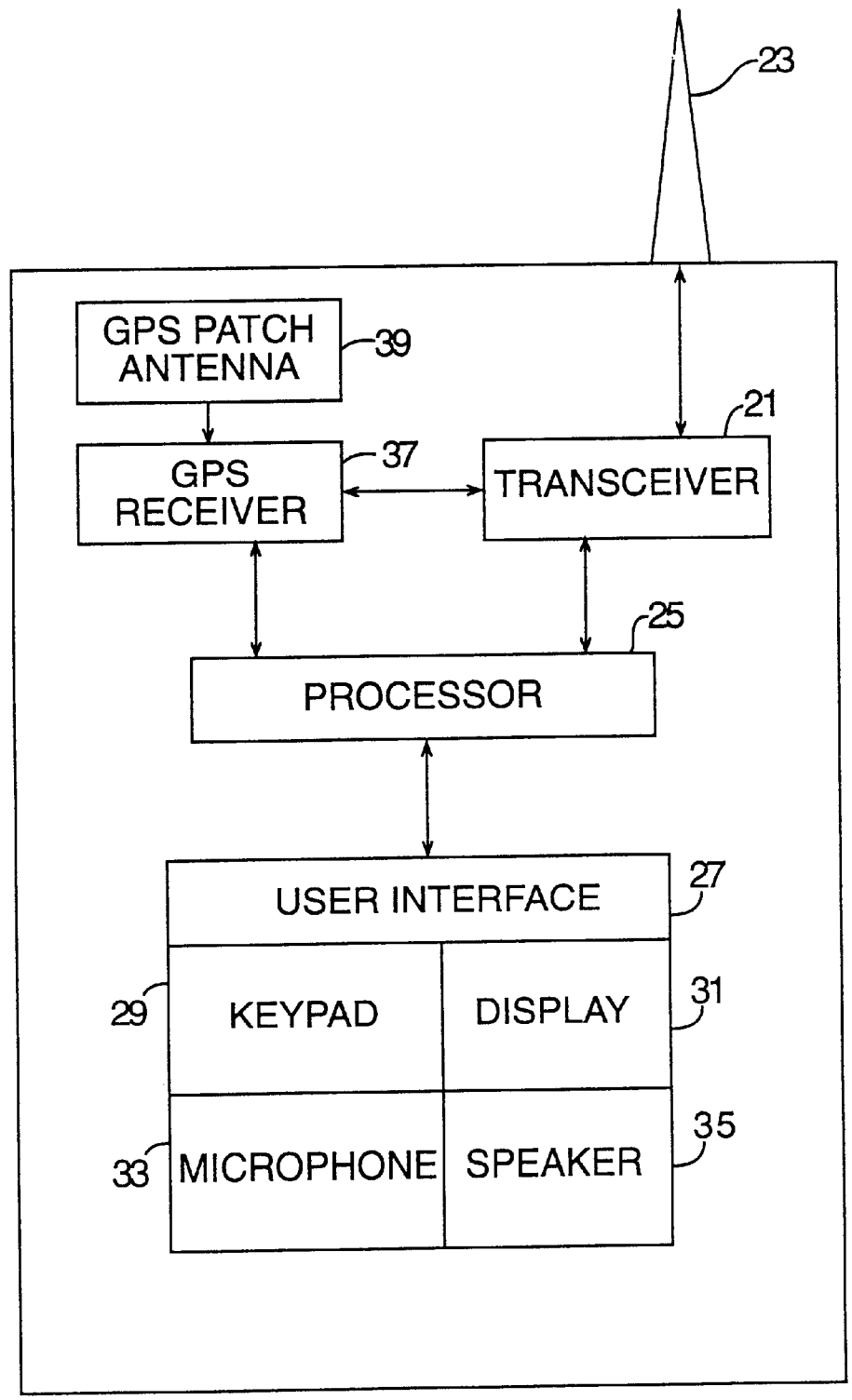
FIG. 1 is a block diagram of a radiotelephone including a patch antenna according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thicknesses of layers and regions of the cross sections are exaggerated for clarity. Like numbers refer to like elements throughout. It will also be understood that when a layer is referred to as being "on" another layer or substrate, it can be directly on the other layer or substrate, or intervening layers may also be present. In contrast, when an element is referred to as being "directly on" another element, there are no intervening elements present.

A cellular radiotelephone including a global positioning system (GPS) receiver according to the present invention is illustrated in FIG. 1. As shown, the cellular radiotelephone includes a transceiver 21 for transmitting and receiving cellular radiotelephone communications through antenna 23, and a processor 25 for processing the communications transmitted and received by the transceiver 21. In addition, a user interface 27 is coupled with the processor, and the user interface can include a keypad 29, a display 31, a microphone 33, and a speaker 35. Accordingly, the radiotelephone can accept user speech through the microphone 33 for transmission to a radiotelephone communications system, and reproduce speech received from a distant party over the radiotelephone communications system using the speaker 35. Radiotelephone information can be provided to the user through the display 31, and user input can be accepted through the keypad 29.

In addition, the radiotelephone of the present invention includes a GPS receiver 37 and a GPS patch antenna 39. The GPS receiver 37 can thus accurately determine the geographic position of the radiotelephone, and provide the geographic information to the radiotelephone processor 25. Accordingly, this geographic information can be provided to the radiotelephone user either visually through the display 31 or audibly through the speaker 35. The geographic information can also be transmitted through the transceiver 21 and the antenna 23 to the radiotelephone communications system. For example, the geographic information can be transmitted during a "911" call to assist an emergency response by police, fire, and/or rescue personnel. The geographic information can also be used, for example, to make call management decisions as discussed in U.S. Pat. No. 5,235,633, spoken with a speech synthesizer as discussed in U.S. Pat. No. 5,625,668, or otherwise communicated to the user of the radiotelephone.

As will be understood by those having skill in the art, the GPS receiver 37, the transceiver 21, and the processor 25 can be provided separately as shown in FIG. 1. Alternately, two or more of these elements can be provided together. For example, the processor can be defined as including one or both of the GPS receiver and the transceiver, and/or the transceiver can be defined as including the GPS receiver. These elements are shown separately for the sake of clarity of this disclosure and not for purposes of limitation. Moreover, these elements can be provided individually or in combination as one or more custom and/or standard integrated circuit and/or discrete devices running firmware and/or software.

Figure 2A:
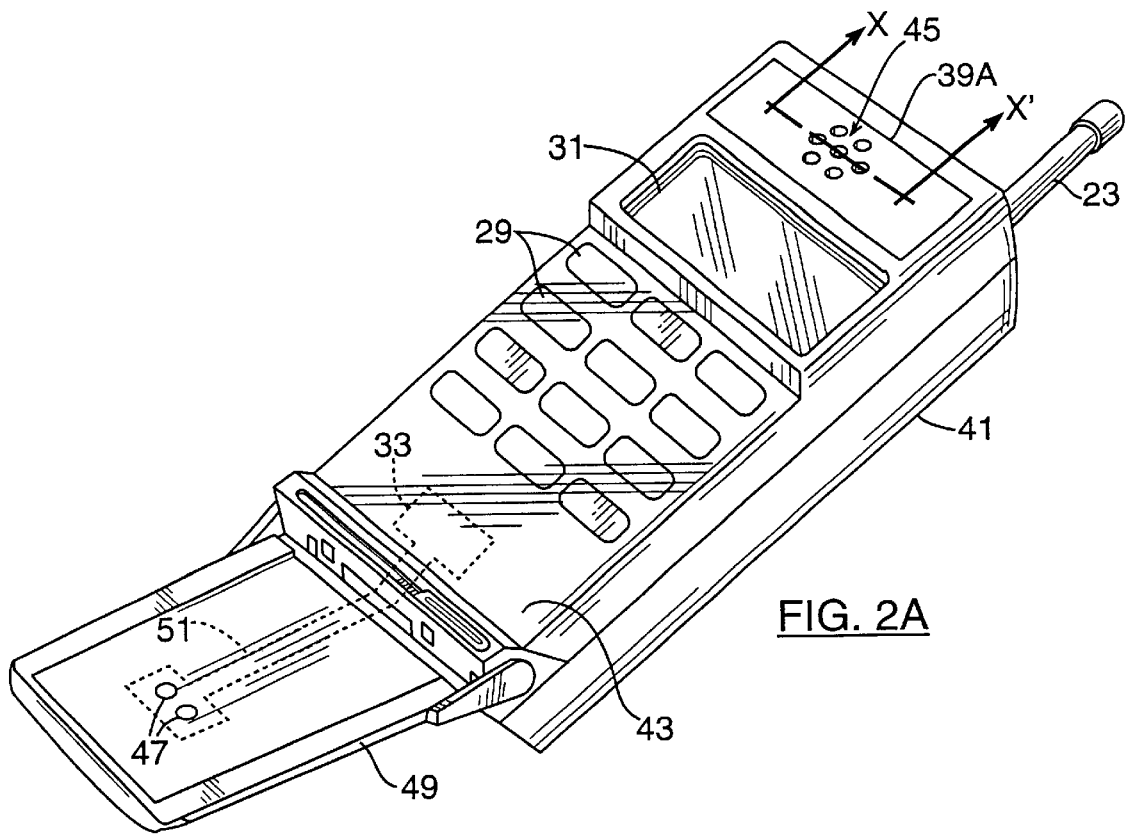
FIG. 2A is a perspective view of a radiotelephone including a patch antenna adjacent to a speaker according to the present invention.

The radiotelephone of the present invention can include the GPS patch antenna without significantly affecting the dimensions of the radiotelephone. As shown in FIG. 2A, the radiotelephone includes a body 41 housing the GPS patch antenna 39A, the display 31, the keypad 29, the microphone 33, and the antenna 23 as shown. In particular, the GPS patch antenna can include a conductive layer, such as a metal layer on a dielectric layer, wherein the conductive layer is approximately 1.0 inch square and the metal layer and the dielectric layer together have a thickness of approximately 0.2 inches. The housing also encloses the GPS receiver 37, the transceiver 21, the processor 25, and the speaker 35 which are not visible in the perspective view of FIG. 2A.

The radiotelephone body includes a front face 43 which is held to the user's head when talking. Accordingly, the speaker 35 is mounted adjacent the front face 43, and holes 45 are provided in the front face adjacent the speaker to allow sound from the speaker to pass therethrough. Moreover, the microphone can be provided adjacent the front face with holes 47 being provided through the front face to allow sound to pass through to the microphone.

More particularly, the radiotelephone body of FIG. 2A includes a moveable flip portion 49 which extends the front face 43 when opened as shown, and the microphone 33 can be included in the main portion of the radiotelephone body. A channel 51 through the flip portion 49 can be used to conduct sound from the holes 47 to the microphone 33. When closed, the flip portion 49 covers a portion of the radiotelephone body. The front face of the radiotelephone body can also include the display 31 and the keypad 29. Accordingly, the flip portion 49 can cover the keypad and/or the display when closed.

According to the present invention, the patch antenna 39A includes a conductive layer substantially parallel to the front face of the radiotelephone body. With dimensions of approximately 1.0 inches square and 0.2 inches thick, the patch antenna can be incorporated in the radiotelephone of the present invention without significantly affecting the dimensions of the radiotelephone. As shown in FIG. 2A, the patch antenna can be located adjacent the speaker with openings therein aligned with the openings 45 in the front face of the radiotelephone body to allow sound to pass therethrough. These relatively small openings (or holes) in the patch antenna can be provided without significantly affecting the antenna performance. Furthermore, the antenna can be tuned to compensate for the addition of these holes. Alternate arrangements of the patch antenna 39A are illustrated in the cross sections of FIGS. 2B–2C.

Figure 2B:
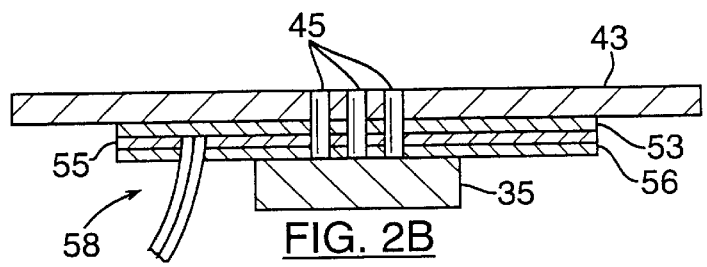
FIGS. 2B–C are cross sectional views of alternate patch antenna structures for the patch antenna of FIG. 2A.

In FIG. 2B, the patch antenna includes a conductive layer 53 on a dielectric layer 55 mounted between the speaker 35 and the front face 43 of the radiotelephone body. As shown, the openings 45 extend through the front face 43 of the radiotelephone body, the conductive antenna layer 53, the dielectric layer 55, and conductive ground layer 56. Accordingly, a conventional patch antenna can be used without significantly affecting the dimensions of the radiotelephone. Preferably, the front face of the radiotelephone body is formed from a plastic or other material which does not significantly attenuate the GPS signals (typically 1575.42 MHz) received by the patch antenna. A typical connection to a patch antenna is made with coaxial cable 58. The center conductor of 58 electrically connects to conductive antenna layer 53 and the ground shield of 58 electrically connects to conductive ground layer 56. It is usually good practice (but not necessary) to make the ground layer 56 of the patch as large as is convenient. The exact size and shape of layer 53 tunes the antenna. The exact placement of the connection between the patch antenna and coaxial cable 58 determines impedance matching and antenna polarization.

Figure 2C:
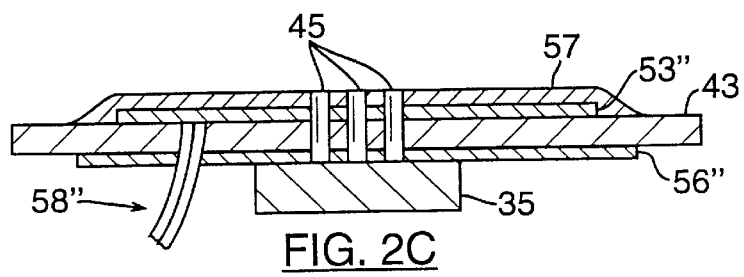

Accordingly to another alternative, shown in FIG. 2C, the patch antenna can include a conductive antenna layer 53" formed on the outside surface of the front face of the radiotelephone body opposite the speaker 35. In addition, a protective layer 57 can be formed on the conductive antenna layer 53" to reduce wear of the conductive layer. Here, the openings 45 extend through the protective layer 57, the conductive antenna layer 53", the front face 43, and conductive ground layer 56", allowing sound from the speaker to pass therethrough. The material and thickness of front face 43 should be consistent with the electrical characteristics of a patch antenna. The dielectric constant and thickness affect the size of layer 53" and the useable bandwidth of the antenna.

The GPS patch antenna 39A discussed above is thus oriented substantially parallel to the front face of the radiotelephone body. Accordingly, the radiotelephone is preferably held with the front face substantially parallel to the ground when receiving GPS signals from GPS satellites. This orientation can provide a circular polarization for the patch antenna that matches the circular polarization of signals transmitted by the GPS satellites. This orientation can be facilitated during GPS operations using messages on the display 31. For example, the processor can generate explicit instructions on the display to hold the telephone in the desired orientation (front face up and away from the user's body) while the location is being determined.

Alternately, this orientation can be encouraged more subtly so that the user is less likely to notice the delay of determining the location. In particular, the processor can generate any message on the display that will hold the user's attention. Because the phone is held in approximately the desired orientation when the user is reading the display, the patch antenna can receive the GPS signals used for location determination. Once the location has been determined, the processor can generate a message on the display instructing the user to continue with normal operations.

Figure 3A:
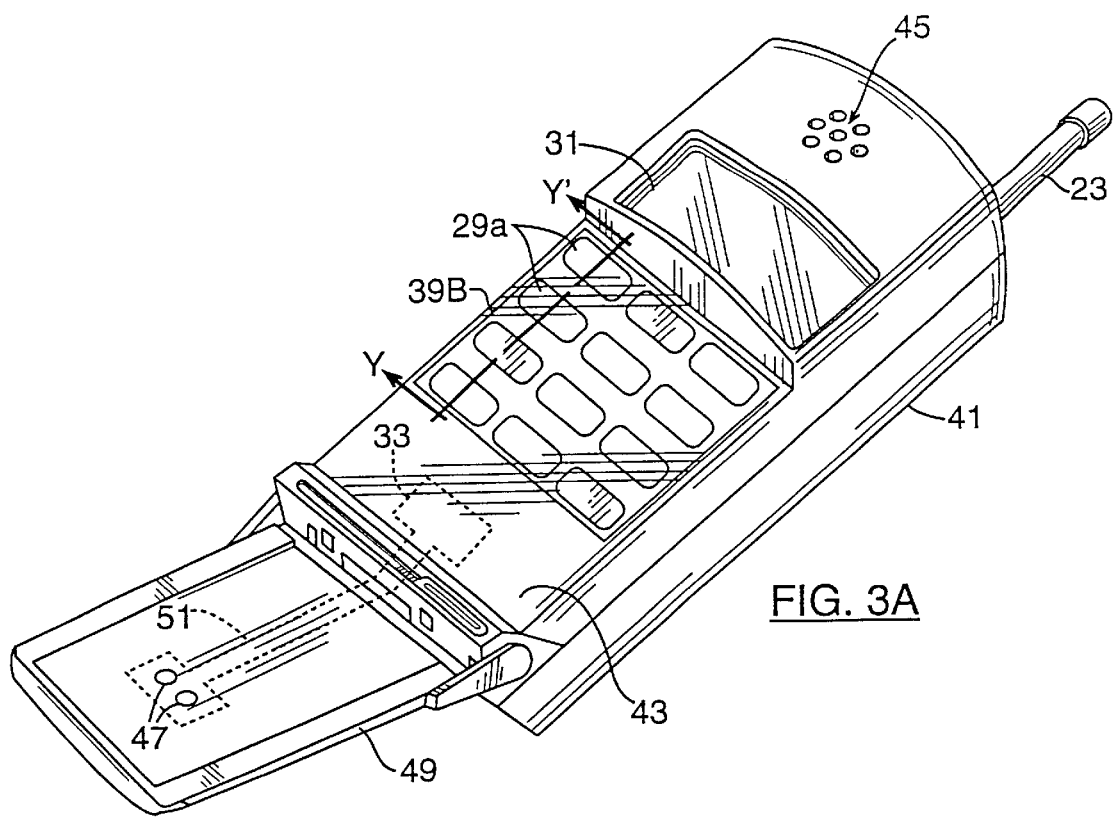
FIG. 3A is a perspective view of a radiotelephone including a patch antenna adjacent to a keypad according to the present invention.

An alternate arrangement of the patch antenna 39B is illustrated in FIG. 3A. In FIG. 3A, the patch antenna 39B provided adjacent the keypad 29 including a plurality of keys 29a, key contacts 29b, PC board substrate 29c, and openings are provided through the front face 43 of the radiotelephone body and the patch antenna 39B to allow movement of the keys 29a therethrough and to allow contact between the keys 29a and the key contacts 29b inside the radiotelephone body. As before, the radiotelephone also incldues an antenna 23, openings 45 in the radiotelephone body allowing sound from the speaker to pass therethrough, a display 31, a microphone 33, a flip portion 49, and openings 47 and channel 51 allowing passage of sound to the microphone. Various patch antenna structures for patch antenna 39B are illustrated in FIGS. 3B–C.

Figure 3B:
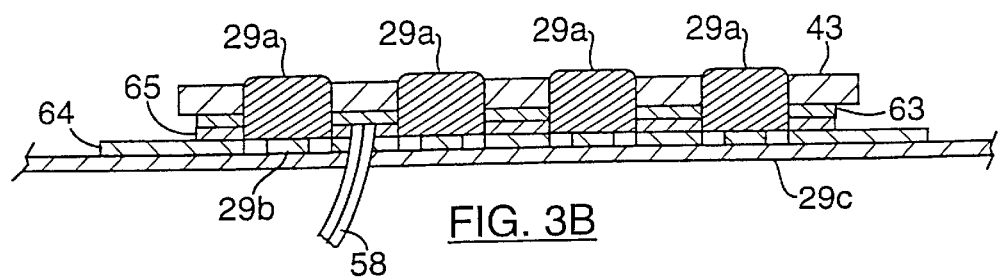
FIGS. 3B–C are cross sectional views of alternate patch antenna structures for the patch antenna of FIG. 3A.

As shown in FIG. 3B, the patch antenna 39B can include a conductive antenna layer 63 on a dielectric layer 65, along with conductive ground layer 64 and coaxial cable 58 attached to layers 63 and 64, and the patch antenna can be mounted along the inside surface of the front face 43 of the radiotelephone body adjacent the keypad 29 including keys 29a. Openings through the front face 43, the conductive layer 63, the dielectric layer 65, and the ground layer 64 provide movement of the keys 29a therethrough as well as contact between the keys and the keypad PC board substrate 29c. The ground layer 64 of the patch antenna can be disrupted by keypad contacts. (and traces) 29b with little impact. The center conductor of coaxial cable 58 connects to layer 63 and the shield of cable 58 connects to layer 64.

Figure 3C:
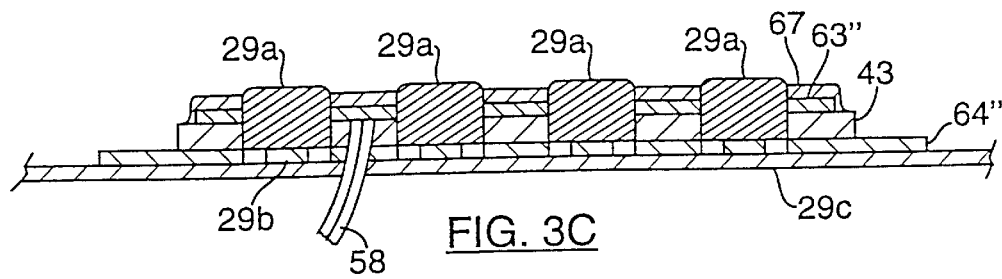

According to another alternative, the conductive layer 63" can be formed on the outside surface of the front face 43 of the radiotelephone body as shown in FIG. 3C. In particular, the conductive layer 63" can be formed on the outside surface of the front face, and a protective layer 67 can be formed on the conductive layer 63". Openings through the front face, the conductive layer, the protective layer, and the conductive ground layer 64" provide for movement of the keys 29a and/or keypad contacts 29b therethrough.

Figure 4A:
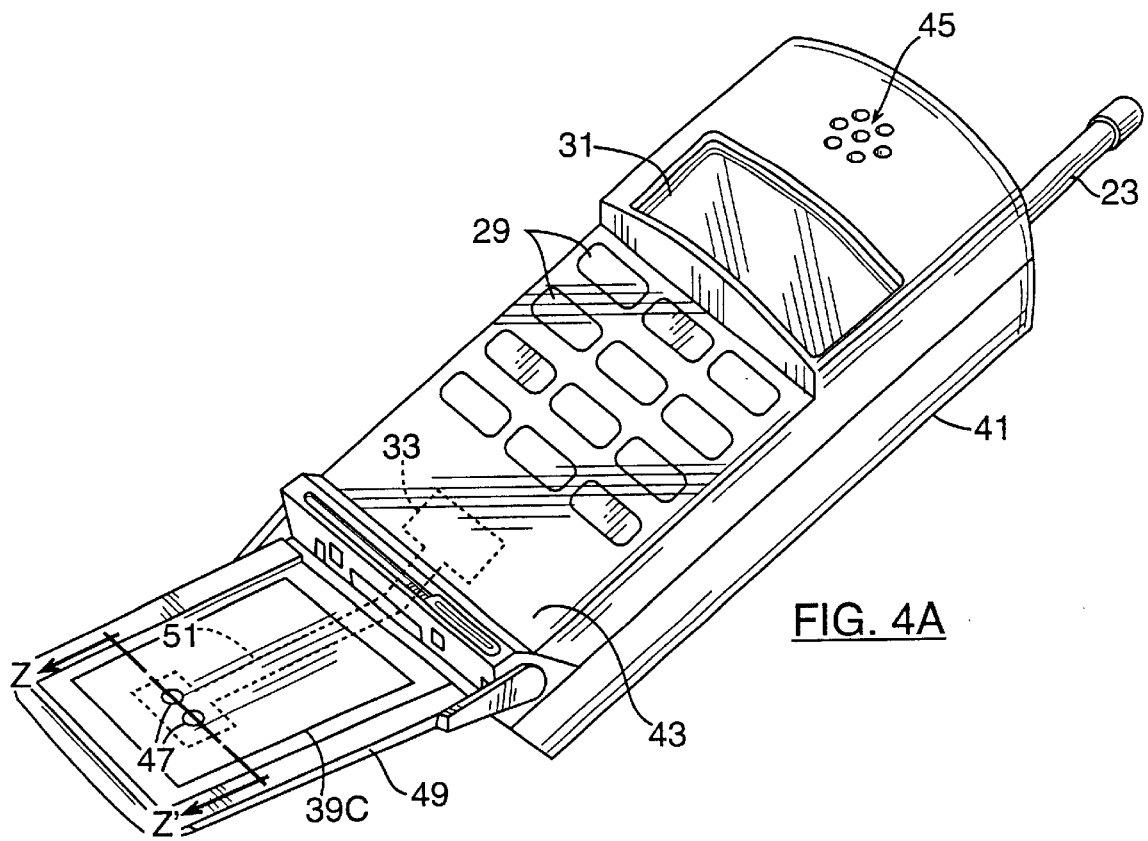
FIG. 4A is a perspective view of a radiotelephone including a patch antenna on a flip portion according to the present invention.

Another alternate arrangement of the patch antenna 39C is illustrated in FIG. 4A. In FIG. 4A, the patch antenna 39C is provided on the flip portion 49 of the front face of the radiotelephone body, and openings are provided through the patch antenna 39C to allow passage of sound therethrough to the microphone 33. As before, the radiotelephone also includes an antenna 23, openings 45 in the radiotelephone body allowing sound from the speaker to pass therethrough, a display 31, a microphone 33, a flip portion 49, and openings 47 and channel 51 allowing passage of sound to the microphone. Various patch antenna structures for patch antenna 39C are illustrated in the cross sectional views of FIGS. 4B–C.

Figure 4B:
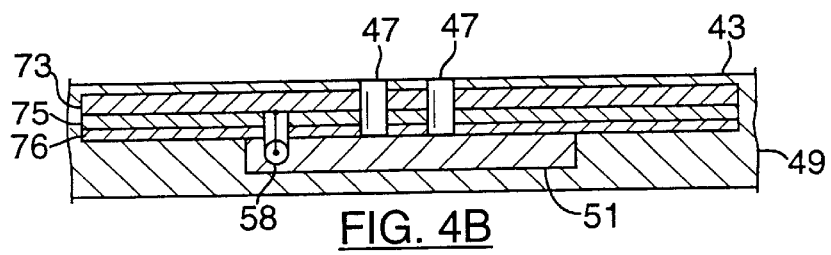
FIGS. 4B–C re cross sectional views of alternate patch antenna structures for the patch antenna of FIG. 4A.

As shown in FIG. 4B, the patch antenna 39C can include a conductive antenna layer 73, a dielectric layer 75, and a conductive ground layer 76 adjacent the front face of the flip portion 49 of the radiotelephone body. Moreover, the openings 47 extend through the front face 43, the conductive layer 73, the dielectric layer 75, and conductive ground layer 76 allowing the conduction of sound therethrough to the channel 51 and the microphone 33. The electrical connection to patch antenna 39c is via coaxial cable 58. The center conductor of cable 58 connects to layer 73 and the shield of 58 connects to layer 76. Cable 58 can be routed physically in cavity 51.

Figure 4C:
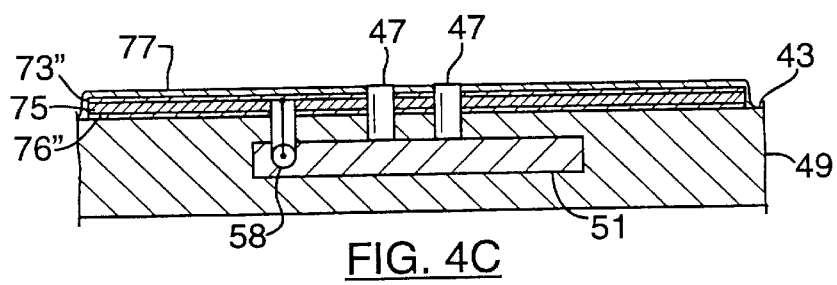

As shown in FIG. 4C, the conductive layers 73" and 76" along with dielectric layer 75 can be formed on the surface of the front face of the flip portion, and a protective layer 77 can be formed on the conductive layer. Again, the openings 47 through the protective layer 77, the conductive layers. 73" and 76" and dielectric layer 75, and the front face of the flip portion allow conduction of sound therethrough to the channel 51 and the microphone 33.

In each of the patch antennas discussed above, the patch antenna can be provided without significantly affecting the dimensions of the radiotelephone. Moreover, holes in the patch antenna allow placement of the antenna adjacent the speaker, the microphone, or the keypad, and any affect of the holes on the performance of the patch antenna can be reduced by tuning the antenna. In addition, the patch antenna in the radiotelephone can provide circular polarization matching that of GPS signals transmitted by GPS satellites. The patch antenna of the present invention can thus provide improved performance over GPS antennas previously used in radiotelephones including GPS functions.

In the drawings and specification, there have been disclosed typical preferred embodiments of the invention and, although specific terms are employed, they are used in a generic and descriptive sense only and not for purposes of limitation, the scope of the invention being set forth in the following claims. Furthermore, while radiotelephones including patch antennas according to the present invention have been discussed with reference to cellular radiotelephones, the patch antennas of the present invention can be used with other radiotelephones such as satellite radiotelephones or dual mode radiotelephones capable of communicating with terrestrial and satellite communications systems, as well as radiotelephones capable of communicating with other types of terrestrial communications systems.

That which is claimed is:

1. A portable radiotelephone comprising:
    a transceiver that transmits and receives radiotelephone communications;
    a processor coupled to the transceiver that processes the radiotelephone communications transmitted and received by the transceiver;
    a speaker coupled to the processor that generates sound responsive to the received radiotelephone communications;
    a microphone coupled to the processor that generates electrical signals for the transmitted radiotelephone communications responsive to outside sound;
    a patch antenna including a conductive layer coupled to at least one of the processor and the transceiver that receives electromagnetic signals wherein the patch antenna has an opening therein wherein the patch antenna comprises a global position patch antenna that receives electromagnetic global position signals from a global position satellite wherein the processor comprises a global position receiver that processes the received electromagnetic global position signals; and
    a display coupled to the processor, wherein the processor generates a message on the display during global position processing to encourage a horizontal orientation of the patch antenna.

2. A portable radiotelephone according to claim 1 further comprising:
    a radiotelephone body housing the processor, transceiver, microphone and speaker, wherein the conductive layer is provided on a dielectric layer inside the radiotelephone body.

3. A portable radiotelephone according to claim 1 further comprising:
    a radiotelephone body housing the processor, transceiver, microphone, and speaker, wherein the conductive layer is provided on a surface of the radiotelephone body.

4. A portable radiotelephone according to claim 3 wherein the conductive layer is provided on an inside surface of a face-of the radiotelephone body.

5. A portable radiotelephone according to claim 3 wherein the conductive layer is provided on an outside surface of a face of the radiotelephone body.

6. A portable radiotelephone according to claim 1 further comprising:
    a radiotelephone body housing the processor, transceiver, microphone, and speaker, wherein the radiotelephone body includes a flip portion that closes to cover a portion of the radiotelephone body and opens to extend the radiotelephone body wherein the patch antenna is located on the flip portion of the radiotelephone body.

7. A portable radiotelephone according to claim 1 wherein the processor generates the message on the display during global processing to encourage the horizontal orientation of the patch antenna and to encourage a corresponding horizontal orientation of the radiotelephone.

8. A portable radiotelephone according to claim 1 wherein the processor generates the message on the display during global processing to encourage the horizontal orientation of the patch antenna and to encourage a corresponding horizontal orientation of the display.

9. A portable radiotelephone comprising:
    a transceiver that transmits and receives radiotelephone communications;
    a processor coupled to the transceiver that processes the radiotelephone communications transmitted and received bV the transceiver;
    a speaker coupled to the processor that generates sound responsive to the received radiotelephone communications;
    a microphone coupled to the processor that generates electrical signals for the transmitted radiotelephone communications responsive to outside sound; and
    a patch antenna including a conductive layer coupled to at least one of the processor and the transceiver that receives electromagnetic signals wherein the patch antenna has an opening therein to allow the generated sound from the speaker to pass therethrough.

10. A portable radiotelephone according to claim 9 wherein the patch antenna comprises a global position patch antenna that receives electromagnetic global position signals from a global position satellite.

11. A portable radiotelephone according to claim 10 wherein the processor comprises a global position receiver that processes the received electromagnetic global position signals.

12. A portable radiotelephone according to claim 11 further comprising:
    a display coupled to the processor, wherein the processor generates a message on the display during global position processing to encourage a horizontal orientation of the patch antenna.

13. A portable radiotelephone comprising:
    a transceiver that transmits and receives radiotelephone communications;
    a processor coupled to the transceiver that processes the radiotelephone communications transmitted and received by the transceiver;
    a speaker coupled to the processor that generates sound responsive to the received radiotelephone communications;
    a microphone coupled to the processor that generates electrical signals for the transmitted radiotelephone communications responsive to outside sound; and
    a patch antenna including a conductive layer coupled to at least one of the processor and the transceiver that receives electromagnetic signals wherein the patch antenna has an opening therein to allow the outside sound to pass through to the microphone.

14. A portable radiotelephone comprising:
a transceiver that transmits and receives radiotelephone communications;
a processor coupled to the transceiver that processes the radiotelephone communications transmitted and received by the transceiver;
a speaker coupled to the processor that generates sound responsive to the received radiotelephone communications;
a microphone coupled to the processor that generates electrical signals for the transmitted radiotelephone communications responsive to outside sound; and
a patch antenna including a conductive layer coupled to at least one of the processor and the transceiver that receives electromagnetic signals; and
a keypad having a key coupled to the processor, wherein the patch antenna is adjacent the keypad and wherein the patch antenna has an opening therein to allow movement of the key therethrough.

15. A portable radiotelephone comprising:
a radiotelephone body having face;
a speaker within the radiotelephone body;
a microphone within the radiotelephone body;
a patch antenna including a conductive layer substantially parallel to the face of the radiotelephone body wherein the patch antenna has an opening therein wherein the patch antenna comprises a global position patch antenna that receives global position signals from a global position satellite;
a display on the radiotelephone body; and
a processor in the radiotelephone body wherein the processor is coupled to the display and to the patch antenna to process the global position signals received from the global position satellite, and wherein the processor generates a message on the display during global position processing to encourage a horizontal orientation of the patch antenna.

16. A portable radiotelephone according to claim 15 wherein the conductive layer is provided on a dielectric layer inside the radiotelephone body.

17. A portable radiotelephone according to claim 15 wherein the conductive layer is provided on a surface of the radiotelephone body.

18. A portable radiotelephone according to claim 17 wherein the conductive layer is provided on an inside surface of the radiotelephone body.

19. A portable radiotelephone according to claim 17 wherein the conductive layer is provided on an outside surface of the radiotelephone body.

20. A portable radiotelephone according to claim 15 wherein the radiotelephone body includes a flip portion that closes to cover a portion of the radiotelephone body and opens to extend the radiotelephone body wherein the patch antenna is located on said flip portion of the radiotelephone body.

21. A portable radiotelephone according to claim 15 wherein the processor generates the message on the display during global processing to encourage the horizontal orientation of the patch antenna and to encourage a corresponding horizontal orientation of the radiotelephone.

22. A portable radiotelephone according to claim 15 wherein the processor generates the message on the display during global processing to encourage the horizontal orientation of the patch antenna and to encourage a corresponding horizontal orientation of the display.

23. A portable radiotelephone comprising:
a radiotelephone body having face;
a speaker within the radiotelephone body;
a microphone within the radiotelephone body: and
a patch antenna including a conductive layer substantially parallel to the face of the radiotelephone body wherein the patch antenna has an opening therein to allow sound from the speaker to pass therethrough.

24. A portable radiotelephone comprising:
a radiotelephone body having face;
a speaker within the radiotelephone body;
a microphone within the radiotelephone body; and
a patch antenna including a conductive layer substantially parallel to the face of the radiotelephone body wherein the patch antenna has an opening therein to allow sound to pass through to the microphone.

25. A portable radiotelephone according to claim 24 wherein the patch antenna comprises a global position patch antenna that receives global position signals from a global position satellite.

26. A portable radiotelephone according to claim 25 further comprising:
a display on the radiotelephone body; and
a processor in the radiotelephone body wherein the processor is coupled to the display and to the patch antenna to process the global position signals received from the global position satellite, and wherein the processor generates a message on the display during global position processing to encourage a horizontal orientation of the patch antenna.

27. A portable radiotelephone comprising:
a radiotelephone body having face;
a speaker within the radiotelephone body;
a microphone within the radiotelephone body; and
a patch antenna including a conductive layer substantially parallel to the face of the radiotelephone body; and
a keypad having a key on the radiotelephone body wherein the patch antenna is adjacent the keypad and wherein the patch antenna has an opening therein allowing movement of the key therethrough.

28. A method of receiving global position satellite signals at a portable radiotelephone including a global position antenna and a global position receiver coupled to the global position antenna, the method comprising the step of:
generating a message during global position processing to encourage a desired orientation of the global position antenna;
wherein the global position antenna is a patch antenna including a conductive layer and wherein the desired orientation of the antenna and a corresponding desired orientation of the radiotelephone are approximately horizontal during global position processing.

29. A portable radiotelephone comprising:
a transceiver that transmits and receives radiotelephone communications;
a processor coupled to the transceiver that processes the radiotelephone communications transmitted and received by the transceiver;
a speaker coupled to the processor that generates sound responsive to the received radiotelephone communications;
a microphone coupled to the processor that generates electrical signals for the transmitted radiotelephone communications responsive to outside sound;

a global position antenna coupled to at least one of the processor and the transceiver that receives global position signals from a global position satellite wherein the processor comprises a global position receiver that processes the received global position signals; and a display coupled to the processor wherein the processor generates a message on the display during global position processing to encourage a desired orientation of the global position antenna;

wherein the global position antenna is a patch antenna including a conductive layer and wherein the desired orientation of the antenna and a corresponding desired orientation of the radiotelephone are approximately horizontal during global position processing.

30. A method of receiving global position satellite signals at a portable radiotelephone including a global position antenna and a global position receiver coupled to the global position antenna, the method comprising the step of:

generating a message during global position processing to encourage a desired orientation of the global position antenna;

wherein the message is generated on a display, wherein the global position antenna is a patch antenna including a conductive layer, wherein the desired orientation of the antenna and a corresponding desired orientation of the display are approximately horizontal during global position processing.

31. A portable radiotelephone comprising:

a transceiver that transmits and receives radiotelephone communications;

a processor coupled to the transceiver that processes the radiotelephone communications transmitted and received by the transceiver;

a speaker coupled to the processor that generates sound responsive to the received radiotelephone communications;

a microphone coupled to the processor that generates electrical signals for the transmitted radiotelephone communications responsive to outside sound;

a global position antenna coupled to at least one of the processor and the transceiver that receives global position signals from a global position satellite wherein the processor comprises a global position receiver that processes the received global position signals; and a display coupled to the processor wherein the processor generates a message on the display during global position processing to encourage a desired orientation of the global position antenna;

wherein the global position antenna is a patch antenna including a conductive layer, wherein the desired orientation of the antenna and a corresponding desired orientation of the display are approximately horizontal during global position processing.

* * * * *

UNITED STATES PATENT AND TRADEMARK OFFICE
CERTIFICATE OF CORRECTION

PATENT NO. : 6,411,826 B1  Page 1 of 1
DATED : June 25, 2002
INVENTOR(S) : William O. Camp, Jr.

It is certified that error appears in the above-identified patent and that said Letters Patent is hereby corrected as shown below:

Column 8,
Line 23, please correct "bV" to read -- by --.

Signed and Sealed this

Thirty-first Day of December, 2002

JAMES E. ROGAN
*Director of the United States Patent and Trademark Office*